United States Patent [19]

Thomas et al.

[11] Patent Number: 4,557,068
[45] Date of Patent: Dec. 10, 1985

[54] PADDED LEGHOLD TRAP

[75] Inventors: Gerald A. Thomas; William E. Askins, both of Lititz, Pa.

[73] Assignee: Woodstream Corporation, Lititz, Pa.

[21] Appl. No.: 557,322

[22] Filed: Dec. 2, 1983

[51] Int. Cl.[4] .......................................... H01M 23/26
[52] U.S. Cl. .......................................... 43/90; 43/96
[58] Field of Search .................... 43/90, 88, 92, 94, 96

[56] References Cited

U.S. PATENT DOCUMENTS

| | | | |
|---|---|---|---|
| 831,037 | 9/1906 | Campbell | 43/96 |
| 1,850,534 | 3/1932 | Clausen | 43/88 |
| 1,859,405 | 5/1932 | McMullen | 43/88 |
| 1,889,351 | 11/1932 | Cooper | 43/88 |
| 2,489,095 | 11/1949 | Lienhard | 43/92 |
| 2,877,596 | 3/1959 | Elencik | 43/88 |
| 3,939,596 | 2/1976 | Webley | 43/90 |
| 4,175,351 | 11/1979 | Souza | 43/90 |
| 4,184,282 | 1/1980 | Lifshutz | 43/90 |
| 4,486,972 | 12/1984 | Helfrich | 43/88 |

Primary Examiner—Nicholas P. Godici
Assistant Examiner—Chris McKee
Attorney, Agent, or Firm—Holman & Stern

[57] ABSTRACT

A padded leghold trap of the pivoting jaw type includes recessed portions of the jaws in which respective pads are disposed. The pads each have concave facing surfaces with an inner edge that barely touches the inner edge of the other pad in the sprung position of the jaws, leaving the remainder of the concave facing surfaces mutually spaced. A trapped animal is held between the padded jaws which spring closed and traps the animal's leg without breaking the leg or causing edema. Attempts by the trapped animal to pull its trapped limb from between the jaws causes the radially inner pad edges to roll over toward the limb and thereby increase the retention forces. A retainer for the pad is disposed over an access slot in the pad, which access slot is provided to deploy the pad on the jaw. The retainer includes a bent lip which deforms the pad toward the jaw to prevent the pad from being pulled off the jaw by a trapped animal. An anchor chain is secured centrally of the trapped frame to assure that forces exerted by a trapped animal in trying to escape are directed generally perpendicular to the jaws to thereby minimize damage to the animal.

30 Claims, 12 Drawing Figures

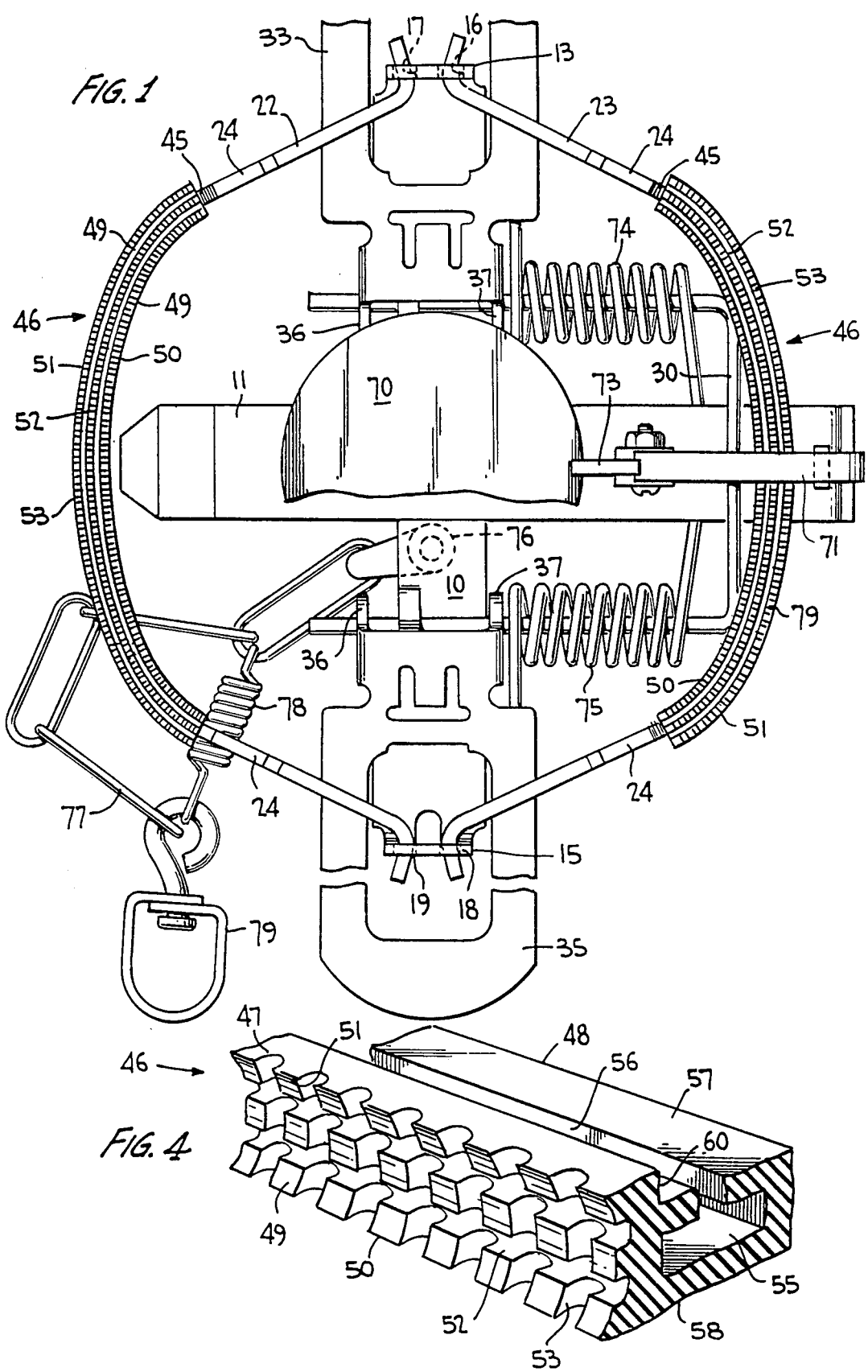

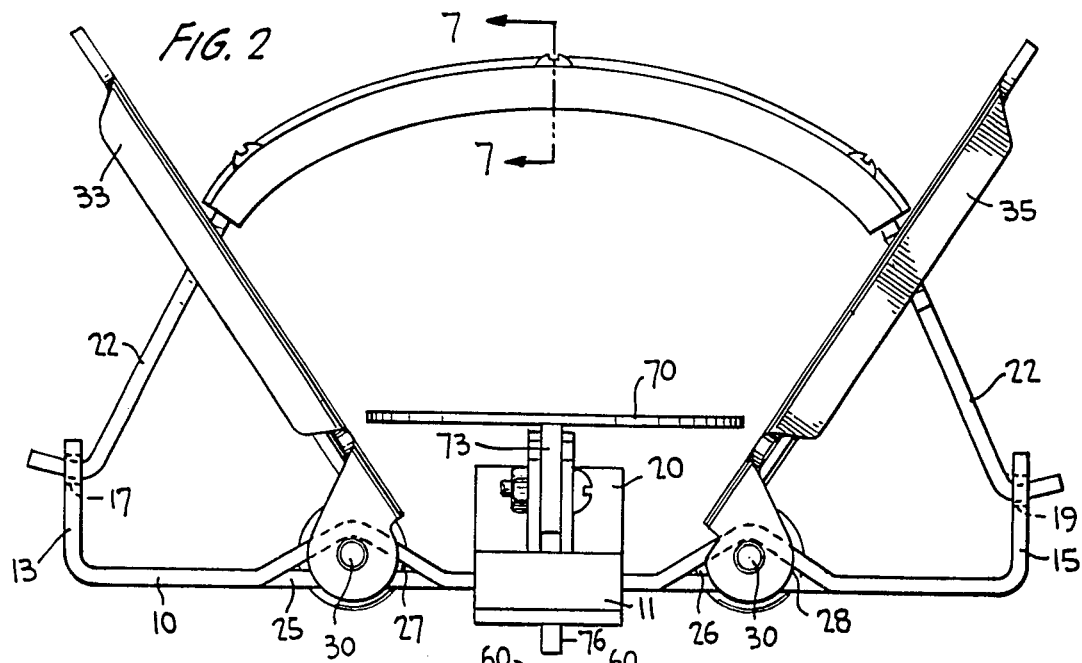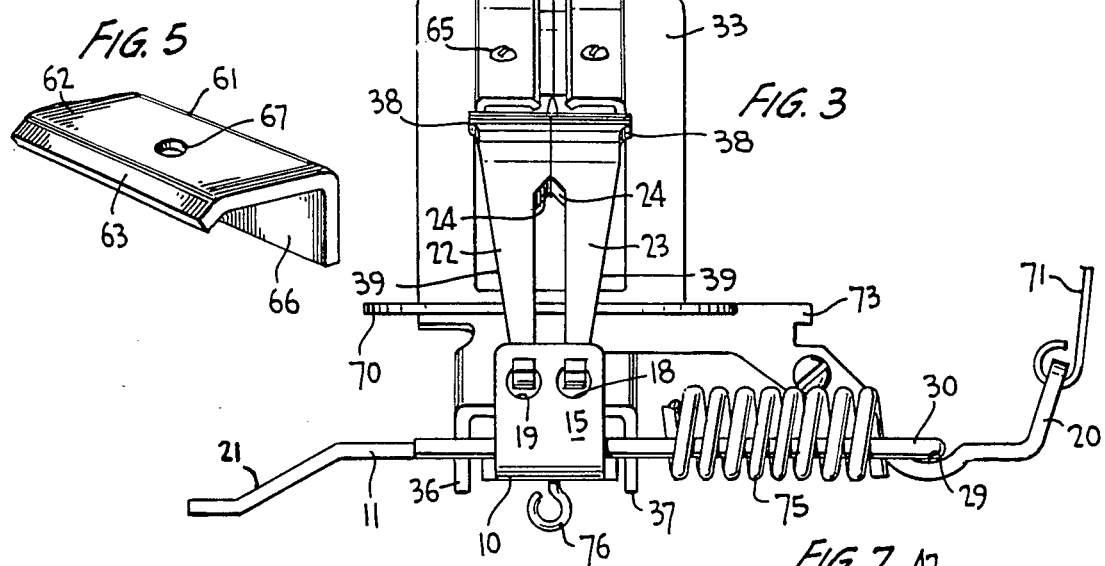

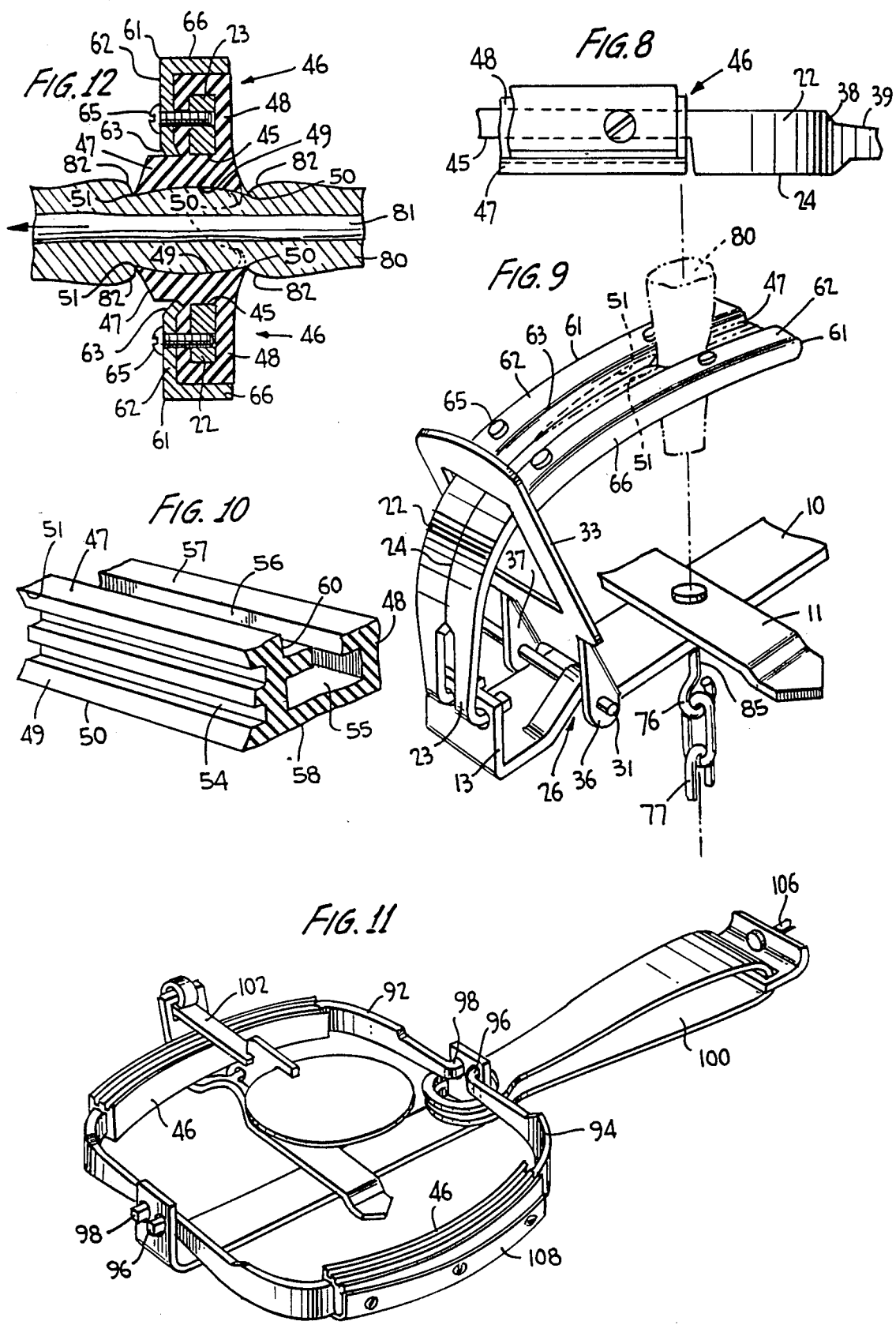

PADDED LEGHOLD TRAP

BACKGROUND OF THE INVENTION

1. Technical Field

The present invention relates generally to padded pivotable jaw animal leghold traps of the kind in which a spring-loaded actuator controls the position of the jaws. More particularly, the invention relates to improved leghold traps which firmly and reliably hold a trapped limb without injuring or producing edema in the limb.

2. Discussion of the Prior Art

The leghold trap of the present invention is an improvement of the trap sold for many years by the assignee of the present invention (Victor Animal Trap Company, Division of Woodstream Corporation, Lititz, Pa.) as the Victor Coil Spring. Traps of this general nature are illustrated in the following U.S. Pat. Nos.: 2,489,095; 2,632,974; 4,240,223; 4,272,907; 4,184,282; and 4,175,351. This type of trap is characterized by a pair of pivotable jaws which are biased from a substantially 180° set position to an abutting sprung position by a spring-loaded actuator. The actuator has at least one aperture through which both jaws extend and which forcefully snaps the jaws together when the trap is sprung. The jaws can be moved to their set position wherein a dog member is rotated over one of the jaws to engage a pan-type trigger disposed between the open jaws. The engaged dog member prevents the jaws from closing in response to the urging force of the actuator. When the pan is rotated, as by an animal stepping thereon, the dog member is released and leaves the jaws unrestrained. The actuator snaps the jaws shut and traps the animal's leg or other appendage therebetween. In unpadded traps, the snapping shut of the jaws has been known to injure the trapped animal, such as by breaking a bone in the trapped limb, rupturing blood vessels in the trapped limb to produce edema, etc. Apart from the resulting trauma and possible permanent damage, under some conditions the trapped appendage becomes numb, causing certain trapped animals to gnaw upon and, in some cases, entirely amputate the trapped limb in an effort to escape.

In an attempt to avoid these undesirable consequences, padded jaw traps have been proposed. The padding of animal traps has long been known, as indicated in the following U.S. Pat. Nos: 870,251; 1,461,743; 1,825,193; 2,128,579; 2,146,464, 2,316,970; 3,939,596; 4,175,351; and 4,184,282. The purpose of the padding material on the trap is to reduce the peak load applied to the trapped appendage upon impact of the jaws while firmly holding the appendage against escape. Although prior art padded traps have partially succeeded in this purpose, there are still a number of instances where in the impact of the padded jaws ruptures blood vessels in the trapped limb and produces a swelling or edema. The resulting pain and numbness, with their attendant consequences as described above, still present a major problem for trappers, as to both humane and pelt appearance considerations. In addition, some padded jaw traps, although quite effective in avoiding injury to the trapped animal, are unable to retain the animal in the trap after the jaws have been sprung. In these traps, it is usually the injury-prevention design which inadvertently facilitates the ability of an animal to escape.

OBJECTS AND SUMMARY OF THE INVENTION

It is therefore an object of the present invention to provide an improved padded leghold trap.

It is another object of the present invention to provide an improved leghold trap which minimizes, if not eliminates, damage and injury to the trapped animal both upon impact of the trapped jaws on the animal's limb and during retention of that limb after the trap has been sprung, and which firmly holds the trapped animal limb to prevent escape.

Still another object of the present invention is to provide an improved padded leghold trap in which the trapped jaws are recessed to accommodate the padding so that opposite pads just touch one another without compressed resilient deformation when the jaws are adjacent one another in the sprung position of the trap.

A further object of the present invention is to provide an improved pad structure in a padded leghold trap which permits an animal's limb to be firmly retained between the closed trapped jaws without danger of removal of the pad by the struggling animal.

It is still another object of the present invention to provide a padded jaw leghold trap in which the jaw pads interact with a trapped limb to increase the retention force against the limb in response to attempts to extricate the trapped limb.

In accordance with the present invention, the facing jaws of a leghold trap are provided with elongated recesses extending along the trapping portion of the jaws. Each recess receives a respective pad which is configured so as to barely touch the other pad along a lineal contact when the jaws are adjacent one another in the sprung position of the trap. The facing surface of each pad is concave in the radial or thickness dimension of the jaw and includes an inner radial edge which provides the aforesaid contact in the sprung position of the jaws, leaving the remaining portions of the facing concave surfaces spaced from one another. The resulting structure permits the jaws to be snapped shut on an animal's limb while keeping the metal of the jaws sufficiently spaced, relative to the trapped limb, so as to avoid both bone breakage and blood vessel rupture. Instead, the resiliently deformable concave pads impact the trapped limb without rupturing blood vessels therein. Edema is thereby eliminated and the animal's limb may be retained in the trap without injury or damage. The radially inner edge of each pad initially compresses and raises a ridge of flesh on the trapped limb. As the animal attempts to pull the trapped limb out from between the pads, the concavity of the pads permits the radially inner edges to roll in toward the concavity and against the trapped limb, thereby wedging the limb between the turned in edges and increasing the retention force of the padded jaws on the trapped limb.

The recesses in the trapping portion of the jaws permit the jaws to be closed on a trapped limb to a smaller mutual jaw angle than can be achieved without recessed jaws. This permits the use of lower pressure actuator springs which also serves to minimize the trauma on the trapped limb. Further, the reduced spring pressure facilitates the rolling of the pad edge to increase retention force in response to attempts to pull the limb out from between the jaws.

The pad has a front segment terminating at one side in the facing surface, and a channel-defining rear segment disposed on the opposite side of the front segment from the facing surface. The channel-defining rear segment has an interior elongated channel defined therein which is adapted to resiliently engage the recessed portion of the jaw on which the pad is disposed. An access slot is defined along the outer radially-facing side of the channel-defining segment to permit that segment to be slipped over the jaw for deployment there on. A cover or retainer is in the form of an elongated two-sided bracket wherein one side, serving as a cover section, is positioned atop the radially-outward facing surface of the channel-defining segment so as to cover the access slot. A forwardly disposed lip of the cover section is bended downwardly to resiliently deform the pad and thereby secure it against the jaw to prevent the pad from being pulled loose from the jaw by a trapped animal.

An anchor chain is secured to the trap frame on a side of the frame which is opposite the location of the jaws. The actual location of the attachment of the anchor chain is centrally disposed with the respect to the jaws to assure that a trapped animal, when pulling on the trap, exerts a force which is only substantially perpendicular to the radially inner edges of the jaw pads at the point of engagement of the animal's limb, thereby minimizing friction-caused damage to that limb.

BRIEF DESCRIPTION OF THE DRAWINGS

These and other objects, features and many of the attendant advantages of the invention will be better understood upon reading the following detailed description when considered in connection with the accompanying drawings wherein like parts in each of the several figures are identified by the same reference numerals, and wherein:

FIG. 1 is a view in plan of one embodiment of the trap of the present invention showing the trap in the set position;

FIG. 2 is a side view in elevation of the trap of FIG. 1 showing the trap in its sprung position;

FIG. 3 is an end view in elevation of the trap of FIG. 2 with one of the actuator levers removed to facilitate clarity;

FIG. 4 is a view in perspective of one embodiment of a pad employed in conjunction with the jaws of the trap of FIG. 1;

FIG. 5 is a view in perspective of a portion of a retainer member employed in conjunction with the pad of FIG. 4 to retain that pad on the jaw of the trap of FIG. 1;

FIG. 6 is a view in perspective showing the pad of FIG. 4 secured to a jaw of the trap of FIG. 1 by means of the retainer of FIG. 5;

FIG. 7 is a view in section taken along lines 7-7 of FIG. 2 and showing the relationship between the jaws, the pad and the retainer of the trap of the present invention;

FIG. 8 is a partial top view in plan of the structure of FIG. 6;

FIG. 9 is a view in perspective of the trap of FIG. 1 shown in its sprung position and illustrating the trap being poked upon by a trapped animal;

FIG. 10 is a view in perspective of a portion of a second embodiment of a pad useful with the trap of FIG. 1;

FIG. 11 is a view in perspective showing a second embodiment of the trap of the present invention; and FIG. 12 is a view in section showing the jaws of a padded trap of the present invention closed on a limb of a trapped animal.

DESCRIPTION OF THE PREFERRED EMBODIMENTS

Referring specifically to FIGS. 1–9 of the accompanying drawings, a trap according to the present invention includes a frame made up of a first base member 10 and a second base 11. Members 10 and 11 are preferably made of steel, as are the other elements of the trap, and are joined by welding, or the like, intermediate their ends to form a cross-like frame. Base member 10, which is disposed below base member 11, has opposite ends which are upwardly bent to define respective flanges 13 and 15. These flanges extend in a vertical plane when the trap is deployed and each is provided with a pair of horizontally-spaced jaw-pivoting apertures designated by the reference numerals 16, 17 for flange 13 and 18, 19 for flange 15. The second base member 11 has a dog-mounting end 20 which is bent generally upward. The opposite or support end 21 of base member 11 is bent downward below the main body of the base member. A pair of generally C-shaped jaws 22, 23 are pivotably secured to flanges 13 and 15. More specifically, opposite end portions of jaw 22 are pivotably received in apertures 17 and 19 of flanges 13 and 15, respectively. Opposite ends of jaws 23 are pivotably received in apertures 16 and 18 of flanges 13 and 15, respectively. Apertures 17 and 19 are aligned to define a horizontal pivot axis for jaw 22, which axis is parallel to a pivot axis for jaw 23 defined by aligned apertures 16 and 18. Jaws 22 and 23 are pivotable between a set position (illustrated in FIG. 1) in which the jaws are angularly spaced by approximately 180°, and a sprung position (illustrated in FIGS. 2 and 3) in which the angle between the jaws is substantially zero degrees.

A pair of longitudinally-aligned inverted V-shaped segments 25, 26 are defined along one of the longitudinally-extending edges of base member 10. The V-shaped segments are bent upwardly from base member 10 to form respective slots 27, 28 just above the top surface of base member 10. Slots 27 and 28 serve to define respective pivot axes for jaw actuator levers, as described below.

A U-shaped spring retainer pin 30 has two parallel legs which extend along the two actuator pivot axes defined by slots 27 and 28, respectively. Specifically, one leg of retainer pin 30 extends through slot 27 while the other leg extends through slot 28. The center portion of U-shaped pin 30 resides in a recess 31 formed across the top surface of base member 11 at a location between dog-mounting end 20 and the intersection with the other base member 10. Recess 29 minimizes movement of pin 30 longitudinally of the legs of the pin.

A pair of actuator levers 33 and 35 are pivotably mounted on respective legs of pin 30. The pivotable mounting of lever 33 is achieved with apertures defined in spaced flanges 36, 37 which are disposed in respective vertical planes and receive one leg of pin 30 at locations adjacent respective longitudinally-extending sides of base member 10. Similar flanges are provided for actuator lever 35 to engage the other leg of pin 30 at respective sides of base member 10. The main body of each lever 33 and 35 is apertured in a plane which contains, or is at least parallel with, the pivot axis for that lever, which axis is defined by the leg of pin 30 engaged by the apertured flanges of that lever. The actuator lever pivot axes are disposed horizontally, when the trap is deployed, and are perpendicular to the pivot axes for jaws 22, 23. The aperture in the actuator levers is wide enough to surround respective portions of jaws 22, 23 in their sprung position and in the closed position of actuator levers 33, 35. In this regard it should be noted that when the actuator levers are in their closed position, the lever apertures force the trap jaws closed to the sprung position of the jaws. The outside edge of each jaw is preferably tapered (i.e., narrowing toward its ends) at 39 to permit the apertures in the actuator levers to accelerate closure of the jaws. In addition, the outside of each jaw may be provided with a shoulder 38 to abut the periphery of the apertures in actuator levers 33, 35 in the closed position to thereby define the closed position by preventing further closure of the mutual angle between the actuator levers. This closed position angle of the actuator levers 33 and 35 is an acute angle which is greater than 0° and, in the illustrated embodiment, is approximately 68°. In the open position of the levers, the angle between them is substantially 180°.

The inner or facing edges of each jaw 22, 23 are provided with a pair of longitudinally spaced protrusions 24 which extend lengthwise along the jaws. Each of the two longitudinally-spaced protrusions 24 on jaw 22 is aligned with and contacts a corresponding protrusion 24 on jaw 23 in the sprung position of jaws 22 and 23. Protrusions 24 define the sprung position and, for this purpose, are preferrably smooth-surfaced. In addition, the forward facing surfaces of the spaced protrusions 24 on each jaw are co-planar to define a contact plane which abuts a similar plane in the sprung jaw condition. Protrusions 24 on each jaw are longitudinally spaced along the jaw by a distance which is slightly less than the spacing between the actuator levers 33, 35 along the jaws in the closed position of the levers.

The lengthwise section of each jaw between spaced protrusions 24 is cut away to form a recess 45, which is recessed from the opposite jaw, such that the recessed central portions (i.e., the trapping portions) of the jaws are spaced from one another in the sprung jaw position. The recessed or trapping portion 45 of each jaw is partially enveloped by a pad 46 of resiliently flexible material. This material, for example, may be any one of a number of resilient materials such as rubbers, elastomers, copolymers, etc., either crosslinked or thermoplastic. In one preferred embodiment the material may be a peroxide-cured composition of an ethylene-propylene-diene rubber, reinforced with carbon black to an approximate hardness of between fifty and fifty-five on the Shore A scale. This material has the advantageous properties of strength and traction, as well as resistance to permanent set and environmental degradation. In addition, the material has a "cold flow" characteristic which permits it to resiliently conform to a trapped limb compressed against the facing surface 49 of the pad.

Pad 46 is an integral member having a front segment 47 and a channel-defining rear segment 48. The front segment 47 has a facing surface 49 which is adapted to just contact the facing surface of front segment 47 of pad 46 on the opposite jaw, without significant flexure in the sprung jaw position. More particularly, facing surface 49 is substantially concave in the depth dimension of jaws 22, 23, which dimension extends radially from the jaw pivot axes. The general concavity of facing surface 49 results in a radially inner edge 50 and a radially outer edge 51 defining two mutually parallel and opposite longitudinally-extending edges of the forward surface. Forward or facing surface 49 has a pattern defined therein to increase the traction or friction of that surface. In the embodiment of FIGS. 1 and 4 this pattern is illustrated as a first plurality of parallel longitudinally-extending channels 52, and a second plurality of parallel transversely-extending channels 53 defined in forward surface 49. Although this embodiment shows that the pattern is, in fact, a plurality of criss-cross recesses caught in the concavity of the resilient material, it is just as clear that a raised pattern on the surface of the concavity could also provide desirable increases in the friction between the facing surface 49 and the animal caught in the trap. Similarly, although a criss-cross pattern means is shown in FIGS. 1 and 4, many various combinations of recesses, ridges, parallel lines and pattern lines for the purpose of increasing the friction of the facing surface 49 and preventing sliding of the animal in the trap, will be obvious to one of ordinary skill in the art, in view of the present disclosure. A particularly advantageous embodiment is illustrated in FIG. 10 wherein the pattern for the facing surface is made of longitudinally-extending channels 54 only. This configuration is advantageously susceptible of extrusion during formation of the pad 46.

The channel-defining rear segment 48 of pad 46 has an interior elongated channel 55 defined therein. Channel 55 is contoured to match, or at least resiliently engage, the periphery of the recessed or trapping portion 45 of a jaw, preferably along the entire length of that jaw portion. In the illustrated preferred embodiment, that jaw portion and the channel 55 have a rectangular cross-section in which the depth (i.e., the radial dimension from the pivot axis of the jaws) is shorter than the width. A longitudinally-extending access slot 56 is defined through the entire length and depth of the top wall 57 of channel-defining rear segment 48 of the pad. Slot 56 permits the trapping portion 45 of a jaw to be inserted there through and into channel 55 so as to deploy the pad 46 of its jaw for use.

Rear segment 48 has a bottom wall 58 which is a co-planar continuation of the bottom wall of front segment 47. However, the top wall 57 of the rear segment is recessed depthwise from the top wall 59 of front segment 47 to define an upstanding shoulder 60 along the entire length of the rearside of the upper part of front segment 47. The space above the top wall 57 and rearwardly of shoulder 60 receives a cover or retainer bracket 61. Bracket 61 is generally L-shaped in transverse cross-section and extends lengthwise along substantially the entire length of pad 46. A top or cover leg 62 of bracket 61 overlies top wall 57 of rear pad segment 48 and thereby entirely covers the access slot 56. The forward edge or lip 63 of cover leg 62 is bent downwardly into top wall 57 adjacent shoulder 60 to resiliently deform the pad along that lineal lip 63 and thereby tightly compressed the top wall 57 against the jaw disposed in slot 55. Cover leg 62 is provided with a plurality of longitudinally-spaced holes 67 which are aligned with the access slot 55 and respective threaded holes 64 in jaw 22, 23 to permit bracket 61 to be secured to the jaw by screws 65 while compressing top wall 57 tightly against that jaw. A rear leg 66 of bracket 61 is disposed at a right angle to cover leg 62 and covers at least a portion of the rear side of rear segment 48 of pad 46. Both bracket 61 and pad 46, when deployed, are bent lengthwise to conform to the curvature of jaws 22, 23 along trapping portion 45.

The configuration of facing surface 49 is such that when the jaws 22, 23 are in their sprung position with opposed protrusions 24 abutting (i.e., nothing trapped between the jaws), the inner radial edges 50 of the two jaw-mouthed pads just contact one another. In addition, the radially outer edges 51 of the two pads likewise contact one another, although such contact between the outer edges 51 is not critical and need not be present in the sprung jaw condition. In either case, this contact is made without significant resilient deformation of the facing surfaces 49 of the two pads. Illustration of this feature is found most clearly in FIG. 7. Referring to FIGS. 6, 7, and 8, the concave sections between the edges 50, 51 of the two facing surfaces 49 are mutually bowed in the fully sprung jaw position. Thus, these concave sections are recessed from one another, inwardly of protrusions 24. In other words, the width dimension of the front pad segment 47 at its narrowest point (i.e., at the radial center of the concavity of facing surface 49) is less than the depth of the recess forming recessed trapping section 45 relative to protrusions 24 in the jaw 22, 23. The width dimension of front section 47 at its thickest parts (i.e., at edges 50, 51), on the other hand, is substantially equal to the depth of the recessed section 45 relative to protrusions 24.

Referring again to FIGS. 1, 2 and 3, a trigger pan 70 is pivotally mounted on base member 11 for movement about a horizontal axis which is oriented slightly above and generally perpendicular to the legs of U-shaped retainer pin 30. A dog member 71 is pivotally mounted to the dog-retaining end of base member 11 about a horizontal axis oriented generally parallel to the pan trigger pivot axis. Pan 70 has a neck portion 73 which includes a dog-retaining slot facing the dog member 71 and which is adapted to receive and hold the distal end of the dog member in a set position of the trap. Jaw 23, in its set position, resides beneath dog member 71 or, more accurately, between the dog member and the base member 11. When the distal end of the dog member is retained in the trigger pan slot, jaw 23 is restrained by the dog member from moving from its set position to the sprung position. This, in turn, restrains movement of both actuator levers 33, 35 from their open position thereby opposing the bias force of the actuator springs.

The actuator springs 74 and 75 take the form of helical springs surrounding respective legs of retainer pin 30 at a location between the base of the U-shaped pin and base member 10. One end of each spring 74, 75 is disposed beneath the base member 11. The other ends are retained along the undersides of respective actuator levers 33, 35 to bias these levers toward their closed position.

Base member 10 is provided with a depending toggle eye member 76 to which a trapped anchor chain 77 is secured beneath the trap. Typically, the distal end 79 of the anchor chain is staked to the ground to prevent a trapped animal from fleeing from the trap clamped to its leg or other appendage. A helical compression spring 78 is secured between links of the chain 77 to provide an expandable or resilient "give" reaction to pulling on the chain by a trapped animal.

The toggle eye member 76 is secured to the underside of base member 11 in a manner to permit free rotation of the toggle member about the longitudinal axis of its stem portion 85, which axis is oriented perpendicular to base member 10. The toggle member is secured at a location which is substantially centered with respect to the two pivot axes of the jaws as determined by the aligned apertures 16, 18 for jaw 23 and apertures 17, 19 for jaw 22. In addition, the toggle eye member 76 is located substantially centrally of flanges 13 and 15 on base member 10.

In operation, the trap is set by forcing the actuator levers 33, 35 apart against the bias force of springs 74, 75, respectively, until the levers abut base member 10. Jaws 22, 23 are then opened to their set position and the distal end of dog member 71 is inserted into the trigger pan retainer slot. With the trap thusly set, the dog member 71 is urged firmly into the trigger pan slot by the force of springs 74, 75 acting through levers 33, 35 and jaw 23. When an animal steps on and rotates the trigger pan 70, the trigger pan slot in neck portion 73 is rotated upward and releases the dog member 71. The dog member then no longer restrains jaw 23 which, in turn, no longer restrains the actuator levers 33, 35. The levers 33, 35 are thus rapidly pivoted closed by springs 74, 75 and force the jaws 22, 23 to spring shut to their sprung position.

When the jaws 22, 23 are sprung on an animal's leg, as illustrated in FIGS. 9 and 12, the spacing between the metal jaws at recesses 45 and the presence of pads 46 in recesses 45 reduce the immediate impact and therefore avoids breaking of bones 81 in the trapped limb 80. The recesses 45 themselves prevent the metal portions of the opposed jaws from coming any closer together than the combined depths of the recesses 45, which depths are selected to be greater than the diameter of the leg of an animal to be trapped. As a consequence, the impact of the facing surfaces 49 on the trapped limb is reduced to the point where even rupture of blood vessels in the trapped limb is avoided. Therefore, the impact of the jaws does not produce swelling and does not numb the animal's limb. The ultimate desirable result is that a trapper can release the animal from the trap uninjured. It can be seen, therefore, that the trap, as described, is more humane than prior leghold traps.

When an animal's limb 80 is trapped between jaws 22, 23, or more particularly, between pads 46, the original geometric concavity of facing surfaces 49 deforms slightly (but not to the point of becoming convex) due to the resiliency of the pads under the pressure of the spring-biased jaws and the opposing pressure of the trapped limb 80. The radial edges 50, 51 of the facing surfaces 49 cause ridges of flesh 82 to be formed quickly adjacent edges 50, 51 of the pads. As the animal attempts to pull the trapped limb radially outward (in the direction of the arrow in FIG. 12), the ridge of flesh 82 adjacent each radially inner edge 50 tends to roll that edge over toward the concave surface 49, causing the edges 50 to sink further into the flesh and tighten the retention pressure on the trapped limb (as illustrated in dashed lines in FIG. 12). This retention of the trapped limb would not be possible if facing surfaces 49 were originally flat or convex, or if such surfaces became convex in the sprung position of the jaws. One important key to retention of the trapped limb is the raised ridges of flesh 82 which are effected by forward-projecting edges 50. The raised ridges 82 should not be confused with edema or swelling resulting from ruptured blood vessels. The rupturing of blood vessels would cause numbing as well as possible permanent injury, not to mention the potential danger of the trapped animal gnawing at its numbed trapped limb. The padded jaws of the present invention avoid such blood vessel rupture but grip the trapped animal tightly enough to raise the ridges of flesh 82 which aid in turning over the edges 50 and increase the holding force exerted on the trapped limb between the padded jaws. The retention of the trapped limb is also aided by the patterns formed at facing surfaces 49, which patterns exert tractional forces against the trapped limb.

The ability of the edge 50 to turn in toward surface 50 and the trapped limb 80 in response to withdrawal attempts by the trapped animal is facilitated by the use springs of lower pressure than is feasible in prior art leghold traps of the same size. In particular, since the facing trapping portions of the jaws are recessed, the angle between the sprung jaws when a limb is trapped therebetween is smaller than would be the case for unrecessed jaws. The smaller mutual jaw spacing permits the actuator levers 33, 35 to ride higher up on the sprung jaws when a limb is trapped between the jaws, thereby affording the levers a greater mechanical advantage. With this greater mechanical advantage available, a trapped limb can be retained securely between the jaws with weaker actuator springs for the jaws. The use of weaker actuator springs has two important advantages: first, it reduces trauma upon impact against the trapped limb, thereby further reducing the possibility of blood vessel rupture; and second, it permits edges to roll over, as described, in response to outward pulling on the trapped limb. This roll over requires an initial slight spreading of the jaws as the animal's limb is pulled before the edges 50 turn over and inwardly of the limb. The momentary spreading is made possible by the fact that springs of reduced force or pressure can be employed. The reduction in spring pressure from that required for prior padded traps of the same size is on the order of thirty-five percent.

As best illustrated in FIG. 9, the location of toggle eye member 76 in a substantially central location, as described above, provides a further advantageous feature of the trap. Specifically, with the proximal end of anchor chain 77 approximately centered, all pulling and tugging of the trapped animal is directed substantially perpendicular to the jaws 22, 23 at the location of the trapped limb. This permits the full retention effect produced by the rolling edges 50 to be employed against limb withdrawal attempts exerted by the animal. In addition, since all withdrawal attempt forces are directed substantially radially outward and axially along the trapped limb, the limb does not tend to move from one position to the other between the pads 46 in response to the withdrawal attempt forces. Such movement, which is possible in many prior art padded traps, exerts frictional forces on the limb which damage the flesh and/or fur and which, if prolonged, could result in edema.

As briefly mentioned above, it is not crucial for outer edges 51 of the pads to meet in the fully sprung jaw condition. This is so because only the inner edges 50 are required to roll over in response to escape attempts by pulling on the trapped limb. Thus, outer edges 51 may mutually spaced in the fully sprung position, as illustrated by the dashed lines in FIG. 9.

Another advantageous feature of the present invention is the bent forward lip 63 to cover member 61. Specifically, it is necessary to provide the access slot 56 in pad 46 in order that the pad may be positioned on the recess section 45 of the jaw 22, 23. In the absence of cover member 61, a trapped animal could possibly pull the pad 46 off the jaw by spreading the resilient pad at the access slot 56 until the jaw became disassociated from the pad. However, the forward lip 63 of cover member 61 compresses the upper wall 57, forwardly of slot 56, against the jaw so as to prevent the separation of the pad from the jaw in response to struggling or pulling by a trapped animal. Moreover, the rasied portion of front segment 47 behind the downwardly bent lip 63 protects the trapped animal. Specifically, the lip is bent down at approximately a 45° angle so that when the animal is trapped, the lip is contained behind the front segment 47 and the trapped limb 80 cannot come into contact with the cover member 61 and be lacerated thereby.

As noted above, the recesses 45 in jaws 22, 23 prevent the metal portions of the jaws from doing damage to the trapped animal limb 80. In a typical embodiment, the depth of the recess is 0.145 inches so that the total spacing between the jaws across the two recesses can never be less than twice this distance or 0.29 inches. Typically, the thinnest dimension of the front segment 47 of pad 46 is 0.1 inch. However, since the pads are resilient, this thickness can be compressed to some extent to accomodate the trapped limb 80. The actuator levers 33, 35 ride up the sloped outer edges 39 during the springing action of the trap, thereby providing a mechanical advantage for these levers. However, because of the recesses 45, the levers can ride higher up the jaws since the jaws can approach their fully closed position more closely when a limb is trapped therebetween than would be the case if no recess was present. In addition, the levers 33, 35 can work all the way up to the stop provided by protrusion 24 as the animal struggles and the jaws become closer together response to the struggling. As noted above, by permitting the actuator levers to ride higher along the jaws as a result of the offset, a higher mechanical advantage is achieved and lesser spring force is required. The spring force for springs 74, 75 can be reduced in a number of ways, such as by using smaller diameter wire, changing the pre-load angle of the spring against lever 35, 33, etc.

The principles described hereinabove for the actuator lever-type leghold trap are equally applicable to the "long spring" version of the leghold trap. Specifically, an embodiment of this type of trap is illustrated in FIG. 11. The trap is basically comprised of a base portion 90 with pivoting jaws 92 and 94 mounted thereon. Jaws 92 and 94 are configured substantially identically with jaws 22 and 23 of the trap of FIG. 1, although the longitudinal bending may be varied to accomodate the different spring actuator mechanism. The jaws rotate about pivot points 96 and 98, defining a pivot axis for each jaw, respectively, under the urging an actuator means, such as the long spring member 100. A latch mechanism 102 holds the jaws in a set position. When an animal presses the trigger means such as a bait petal 104, the latch means is released, permitting spring 100 to force jaws 92 and 94 to a closed or sprung position. When the jaws have closed on an animal's limb, a chain 106, which may be anchored to a relatively solid object and connected to the trap, prevents the trap from moving. The jaws 92 and 94 are recessed in their trapping portions in the same manner as described above for recessed sections 45 of jaws 22 and 23. These recessed portions of jaws 92 and 94 are provided with pads 106 which are substantially identical to pad 46 described hereinabove in relation to FIGS. 1-10. A cover member 108, substantially identical to cover member 61, is provided for pad 106. The advantageous features and operation of the trap described in reference of FIGS. 1-10 are also present for the trap described in relation to FIG. 11.

It is preferred that the pads 46 be readily removable so that they can be replaced after a number of uses. To that purpose, the pads are held in place solely by cover or retainer 61 and are not glued or otherwise permanently adhered to the jaws.

We have described a trap which is more humane than prior leghold traps in that an animal is not injured or damaged by having been trapped between the recessed padded jaws. The anchor chain is secured to the trap, in the preferred embodiment, at a location which also minimizes injury and trauma to the trapped animal. Apart from being more humane, the recessed jaws permit reduced spring strength to be employed to achieve the same degree of retention effect.

Having described several embodiments of a new and improved leghold animal trap constructed in accordance with the present invention, it is believed that other modifications, variations and changes will be suggested to those skilled in the art in light of the foregoing description. It is therefore to be understood that all such variations, modifications and changes are believed forward in the scope of the present invention as defined by the appended claims.

We claim:

1. In an animal trap of the type comprising a frame, first and second jaws having first and second jaw surfaces, respectively, and mounted adjacent one another on said frame for pivotable movement about first and second axes, respectively, and between set and sprung positions, said jaws in said set position defining a relatively wide angle therebetween with said first and second jaw surfaces spaced from one another, and in said sprung position defining an angle of substantially zero degrees therebetween with said first and second jaw surfaces abutting one another, acutator means for continuously and forcefully urging said jaws to said sprung position, setting means for defining said set position by holding said jaws in said set position against the urging of said actuator means, and actuable trigger means for releasing said setting means to permit said jaws to be snapped by said actuator means to said sprung position under the urging of said spring means, an improvement comprising:

first and second recesses defined in said first and second jaw surfaces, respectively, to define a gap between elongated contacting portions of said first and second jaw surfaces in said sprung position of said jaws; and padding means carried by each jaw for cushioning the impact of said jaws snapping together on a member trapped between the jaws, said padding means comprising a first pad disposed in said first recess between said first and second contacting portions and a second pad disposed in said second recess between said third and fourth contacting portions and opposite said first pad in said sprung position of said jaws, said first and second pads being resiliently compressable in a direction inwardly of said first and second recesses, respectively;

wherein said elongated contacting portions include first and second elongated edges of said first jaw surface disposed in co-planar relation on opposite sides of said first recess, and third and fourth elongated edges of said second jaw surface disposed in co-planar relation on opposite sides of said second recess, and wherein, in said sprung position of said jaws, said first and third edges contact one another to form a first elongated contact portion, and said second and fourth edges contact one another to form a second elongated contact portion co-planar with said first elongated contact portion.

2. The animal trap according to claim 1 wherein said first and second pads each includes a facing surface which faces the facing surface of the other of the said pads in the sprung position of said jaws, each facing surface having a radially inner longitudinally-extending edge and a radially outer longitudinally-extending edge spaced from one another depthwise of said recesses by a resilient radially central portion, said radially inner edge extending forwardly of said central portion toward the radially inner edge of the facing surface of the other of said pads in the sprung jaw position such that the radially inner edge of said first pad contacts the radially inner edge of said second pad, but the central portions of the first and second pads are mutually spaced when said jaws are in said sprung position.

3. The animal trap according to claim 2 wherein said radially inner edge of each pad is sufficiently resilient in a radial sense to permit that edge, when compressed against a trapped animal limb disposed between the sprung jaws, to be rolled over toward the central concave portion of its pad in response to radially outward forces exerted on the trapped animal limb.

4. The animal trap according to claim 3 wherein said first and second recesses each include: a depth dimension extending entirely through the first and second jaw surfaces, respectively, in a radial direction relative to the pivot axes for the first and second jaws, respectively; a width dimension extending perpendicularly into said first and second jaw surfaces, respectively; and a length dimension extending along said first and second jaw surfaces, respectively, in a direction perpendicular to said depth and width dimensions; wherein the lengths of said first and second recesses are considerably greater than the widths and depths of said first and second recesses, respectively; and wherein said first and second pads are co-extensive lengthwise with a major portion of the lengths of said first and second receses, respectively.

5. The animal trap according to claim 4 wherein said first and second recesses are substantially co-extensive lengthwise in said sprung position of said jaws.

6. The animal trap according to claim 5 wherein said first and second pads are substantially co-extensive lengthwise and extend over substantially the entire lengths of said first and second recesses, respectively.

7. The animal trap according to claim 2 wherein the facing surfaces of said first and second pads are generally concave in cross-section taken transversely of the pad length.

8. The animal trap according to claim 6 further comprising a pattern of channels defined in said facing surfaces for increasing friction at said facing surfaces.

9. The animal trap according to claim 7 wherein said radially inner edge of each pad extends widthwise outwardly from the recess in which that pad is disposed to a location substantially co-planar with said elongated edges on the jaw in which that recess is defined.

10. The animal trap according to claim 7 wherein each jaw at said recess has a predetermined cross-sectional configuration, and wherein said first and second pads are respective flexible resilient integral members each having: a front segment terminating at one side in said facing surface, and a channel-defining segment disposed on the opposite side of said front segment from said facing surface, said channel-defining segment having an interior elongated channel defined therein extending in the length dimension of said each jaw and having a transverse cross-section substantially similar to said predetermined cross-section to permit said each jaw to be resiliently engaged in said interior channel at said recess, said channel-defining segment having a longitudinally-extending access slot defined therein for permitting the said each jaw to be inserted through the access slot and into said channel; and further comprising the first and second cover means secured to said first and second jaws, respectively, over said access slot in said channel-defining segment to compress each pad against its jaw and thereby retain the pad in place.

11. The animal trap according to claim 10 wherein said cover means comprises a rigid member having a cover section which is substantially co-extensive with and disposed over said access slot in said pad, said cover section including a lip portion which is bent to resiliently deform the pad against the jaw to aid in securing the pad to the jaw.

12. The animal trap according to claim 11 wherein said access slot is disposed over a radially-facing surface of said each jaw when the jaw is properly inserted in said channel, and said cover section is disposed over said access slot with said lip portion generally facing said front segment of said pad.

13. The animal trap according to claim 12 wherein said front segment of said pad has a greater radial thickness than the channel-defining segment, thereby defining a shoulder region rearwardly of said front segment, and wherein said cover section is disposed within said shoulder region.

14. The animal trap according to claim 13 wherein the combined radial thickness of said channel-defining segment and said cover section is substantially equal to the radial thickness of said front segment such that the radially inner and outer edges of said front segment are substantially co-planar with the radially inner and outer edges, respectively, of the combined channel-defining segment and cover section.

15. The animal trap according to claim 14 wherein said cover means includes a rear section formed integrally with and bent at right angles to said cover section, said rear section being positioned over a surface of said channel-defining segment which faces in an opposite direction from said facing surface.

16. The animal trap according to claim 3 wherein said outer edges of each of said pads extend forwardly toward and contact the outer edges, of the other of said pads in the sprung jaw position.

17. The animal trap according to claim 1 further comprising an anchor line secured to said frame for anchoring said frame to the ground, said anchor line being secured to a side of said frame opposite said jaws and at a location which resides in a plane co-planar with said elongated contact portion and passing between said jaws in a sprung jaw position, said location being substantially equidistant from the opposite longitudinal ends of each of said first and second recesses.

18. The animal trap according to claim 17 wherein said anchor line is longitudinally resiliently expandable in response to tension forces applied thereto.

19. An animal leghold trap comprising:
a frame;

first and second jaws pivotable mounted on said frame for movement about first and second pivot axes, respectively, between set and sprung positions, said set position being characterized by a relatively large angular spacing between said jaws, said sprung position being characterized by a substantially zero angle between said jaws;

spring-loaded actuator means, moveable between open and closed positions, for continually biasing said jaws toward said sprung position;

setting means for defining said relatively large angular spacing by holding said jaws in said set position against the urging of said actuator means;

trigger means for selectively releasing said setting means to permit the jaws to be snapped to said sprung position by said actuator means;

wherein said first and second jaws are first and second elongated members which are deformed in length to dispose portions of said first member at spaced locations along said first pivot axis and to dispose portions of said second member at spaced locations along said second pivot axis, said jaws having respective first and second trapping edges which are positioned adjacent one another in the sprung position of said jaws, said first and second trapping edges each including respective first and second elongated recesses disposed substantially co-extensive with one another to provide a gap between the recessed portions of said adjacent trapping edges in the sprung jaw position; and first and second resiliently deformable elongated pads secured to said first and second jaws, respectively, and disposed in said first and second recesses, respectively, said pads being positioned to just contact one another along respective lineal pad edge portions without substantial resilient deformation of the pads when said jaws are positioned adjacent one another in the sprung jaw position;

wherein said first and second pads each include a facing surface which is generally concave in one dimension extending radially from said first and second pivot axes, respectively, the generally concave surface including a radially outer edge and a radially inner edge, said inner edge constituting a most forwardly-extending portion of said facing surface, wherein the radially inner edge of said first pad just contacts the radially inner edge of said second pad without substantial resilient deformation in the sprung position of said jaws, leaving the concave portions of said first and second facing surfaces mutually spaced.

20. The animal trap according to claim 19 wherein said generally concave facing surface of said first and second pads is provided with a pattern of channels for increasing friction at said facing surface.

21. The animal trap according to claim 20 wherein said pattern of channels includes plural channels extending longitudinally of said pads.

22. The animal trap according to claim 21 wherein said pattern of channels additionally includes plural channels extending perpendicular to said longitudinally-extending channels.

23. The animal trap according to claim 22 wherein each jaw at said recess has a predetermined cross-sectional configuration, and wherein said first and second pads are respective flexible resilient integral members each including:

a front pad segment terminating at one side in said facing surface; and a channel-defining pad segment disposed on the opposite side of said front segment from said facing surface;

wherein said channel-defining segment includes an interior elongated channel defined therein extending in the length dimension of said each jaw and having a transverse cross-section substantially similar to said predetermined cross-sectional configuration to permit said each jaw to be resiliently engaged in the interior channel at said recess;

wherein said channel-defining pad segment includes a longitudinally-extending access slot defined therein for permitting the said each jaw to be inserted through the access slot and into said channel;

wherein said trap further comprises first and second cover means secured to said first and second jaws, respectively, over said access slot in said channel-defining segment to compress each pad against its jaw and thereby retain the pad in place.

24. The animal trap according to claim 23 wherein said cover means includes a rigid member having a cover section which is substantially co-extensive longitudinally with and disposed over said access slot in said pad, said cover section including a lip portion which is bent toward the jaw to resiliently deform the pad against the jaw to aid in securing the pad to the jaw.

25. The animal trap according to claim 24 wherein said access slot is disposed over a radially-facing surface of said each jaw when the jaw is properly inserted into said channel, and said cover section is disposed over said access slot with said lip portion generally facing said front segment of said pad.

26. The animal trap according to claim 25 wherein said front segment of said pad has a greater radial thickness than the channel-defining segment, thereby defining a shoulder region rearwardly of said front segment, and wherein said cover section is disposed within said shoulder region.

27. The animal trap according to claim 26 wherein the combined radial thickness of said channel-defining segment and said cover section is substantially equal to the radial thickness of said front segment such that the radially inner and outer edges of said front segment are substantially co-planar with the radially inner and outer edges, respectively, of the combined channel-defining segment and cover section.

28. The animal trap according to claim 19 further comprising a flexible anchor line secured to said frame for anchoring said frame to the ground, said anchor line being secured to a side of said frame which is opposite said jaws and at a location on said frame which resides in a plane co-planar with said radially inner edges of said pads and passing between said jaws in the sprung position of said jaws, said location being equidistant from the opposite longitudinal ends of each of said first and second recesses.

29. The animal trap according to claim 28 wherein said anchor line is longitudinally resiliently expandable in response to tension forces applied to said anchor line.

30. The animal trap according to claim 19 wherein said radially inner edge of each pad is sufficiently resilient in a radial sense to permit that edge, when compressed against a trapped animal limb disposed between the sprung jaws, to be rolled over toward the central concave portion of its pad in response to radially outward forces exerted on the trapped animal limb.

* * * * *